United States Patent
Yamazaki et al.

(10) Patent No.: US 6,384,886 B2
(45) Date of Patent: May 7, 2002

(54) ELECTROOPTICAL DISPLAY DEVICE USING AN ACTIVE MATRIX DISPLAY IN WHICH A LIGHT REFLECTION FILM HAVING A FLAT SURFACE OVER THE PIXEL ELECTRODE AND THE TEXTURED BODY, AND THE PIXEL ELECTRODE HAVING A FLAT SURFACE

(75) Inventors: Shunpei Yamazaki, Tokyo; Yoshiharu Hirakata, Kanagawa, both of (JP)

(73) Assignee: Semiconductor Energy Laboratory Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/329,597

(22) Filed: Jun. 10, 1999

(30) Foreign Application Priority Data

Jun. 12, 1998 (JP) .......................... 10-165723

(51) Int. Cl.$^7$ ................................. G02C 5/16
(52) U.S. Cl. ...................... 349/113; 349/114
(58) Field of Search ................... 349/113, 114, 349/137

(56) References Cited

U.S. PATENT DOCUMENTS

| | | | |
|---|---|---|---|
| 4,470,669 A | | 9/1984 | Kubota et al. |
| 4,556,288 A | * | 12/1985 | Sekimura ................ 350/339 R |
| 4,822,144 A | | 4/1989 | Vriens |
| 5,105,289 A | | 4/1992 | Sonehara et al. |
| 5,132,814 A | | 7/1992 | Ohkauchi et al. |
| 5,453,859 A | | 9/1995 | Sannohe et al. |
| 5,526,149 A | * | 6/1996 | Kambe et al. ................ 359/70 |
| 5,587,816 A | | 12/1996 | Gunjima et al. |
| 5,610,741 A | * | 3/1997 | Kimura ...................... 349/113 |
| 5,643,826 A | | 7/1997 | Ohtani |
| 5,648,277 A | | 7/1997 | Zhang et al. |
| 5,673,127 A | | 9/1997 | Takahara et al. |
| 5,805,252 A | * | 9/1998 | Shimada et al. ............. 349/113 |
| 5,875,008 A | | 2/1999 | Takahara et al. |
| 5,923,962 A | | 7/1999 | Ohtani et al. |
| 5,943,109 A | * | 8/1999 | Kim ........................... 349/113 |
| 6,130,736 A | * | 10/2000 | Sasaki et al. ............... 349/122 |
| 6,154,264 A | * | 11/2000 | Koide et al. ................ 349/113 |

FOREIGN PATENT DOCUMENTS

| | | | |
|---|---|---|---|
| JP | 06-160822 | | 6/1974 |
| JP | 6-160822 | * | 6/1994 |
| JP | 7-130652 | * | 5/1995 |
| JP | 07-130652 | | 5/1995 |
| JP | 07-135318 | | 5/1995 |
| JP | 7-135318 | * | 5/1995 |
| JP | 08 101383 | | 4/1996 |
| JP | 09-312260 | | 12/1997 |
| JP | 9-312260 | * | 12/1997 |

OTHER PUBLICATIONS

English translation of JP 06–160822.
English abstract re JP 06–160822.
English abstract re JP 07–130652.
English abstract re JO 07–135318.
English abstract re JP 09–312260.

* cited by examiner

*Primary Examiner*—Kenneth Parker
*Assistant Examiner*—Mike Qi
(74) *Attorney, Agent, or Firm*—Cook, Alex, McFarron, Manzo Cummings & Mehler, Ltd.

(57) ABSTRACT

A novel liquid crystal display device and a manufacturing process thereof are provided, the display device being provided with a light reflection film by which incident light is reflected more efficiently than in a conventional case. By providing a texture body formed of a material having a low refractive index on reflection electrodes and by forming thereon a light reflection film formed of a material having a high refractive index, a high degree of scattering and a high refractivity can be materialized.

81 Claims, 10 Drawing Sheets

ELECTROOPTICAL DISPLAY DEVICE USING AN ACTIVE MATRIX DISPLAY IN WHICH A LIGHT REFLECTION FILM HAVING A FLAT SURFACE OVER THE PIXEL ELECTRODE AND THE TEXTURED BODY, AND THE PIXEL ELECTRODE HAVING A FLAT SURFACE

BACKGROUND OF THE INVENTION

1. Field of the Invention

The present invention relates mainly to a reflection type display device, and to a direct viewing type display device which materializes high contrast and display in white by scattering reflected light. The present invention is particularly effective in a reflection type liquid crystal display device using a liquid crystal material having an electrooptical effect and in an applied product using such a display device (a portable information apparatus, a personal computer, a word processor, and the like).

It is to be noted that an electrooptical display device as used herein refers to any apparatus which functions by utilizing an electrooptical material. Therefore, the above-mentioned liquid crystal display device also falls within the category of electrooptical display devices. However, in this specification, for the sake of clarity, the term "a liquid crystal display device" and the term "an electrooptical display device" are used differently.

2. Description of the Related Art

Recently, it has become common to display picture data and dynamic images at an information terminal such as a portable personal computer. In order to accommodate this trend, color picture display devices are materialized as transmission type display devices. Transmission type liquid crystal display devices are also widely used for displays in video cameras and digital cameras.

However, there is a problem that the power consumption of a back light limits the usable time of such a transmission type display device.

This leads to trial manufacture of many reflection type color display devices which can display pictures in 4,096 colors or more.

As conventional reflection type display devices, liquid crystal display devices for electronic calculators, various kinds of watches which are mainly wristwatches, electronic organizers, portable computers, and the like are known. Power consumption in those devices is lower than that of transmission type liquid crystal display devices because they do not use a back light. Therefore, they are highly demanded as direct viewing type display devices for portable computers, information terminals, and the like which are usable for a long time. As a result, reflection type color display devices are now required to be further improved with regard to the brightness and the contrast.

Further, conventional reflection type display devices display in black and white for technical and economical reasons. In this case, through the expression is "black and white," the white is not as white as paper, but is actually pale green or gray. This is due to the operation mode of the liquid crystal being used.

With regard to display of character information and symbols, this causes no particular problem in the practical aspect and this is also advantageous in the economical aspect.

With regard to the above-mentioned display devices of black and white type, brighter display which is almost as white as paper is desired.

FIG. 12 is a schematic view of an example of a conventional structure. In FIG. 12, switching elements 11 such as thin film transistors, an interlayer insulating film 12, pixel electrodes 13, an orientated layer 14-1, a liquid crystal layer 15, the orientated layer 14-2, and an opposing electrode 16 are formed between a substrate 10 and an opposing substrate 17 in this order from the top surface of the substrate 10. Also, incident light 20 is reflected by the pixel electrodes to cause reflected light 21. It is to be noted that, though FIG. 12 as a schematic view does not show the whole structure, many switching elements and many pixel electrodes are formed in matrix on the surface of the substrate 10.

The reflection type liquid crystal display device utilizes an optical modulation action of the liquid crystal as an electrooptical material, and materializes a state where incident light is reflected by a reflection electrode of a pixel to be emitted to the external of the device and a state where incident light is not emitted to carry out bright display and dark display, thereby displaying an image.

It is to be noted that silver may be used as the material of the reflection electrodes of the pixel portion. However, in spite of its high reflectance, since silver is difficult to be processed minutely and easy to be oxidize, so that the state of its surface is difficult to maintain, it is behind in applying to products except for some cases.

Therefore, it is common to use aluminum or aluminum alloy which are excellent in processability and have the reflectances of almost 92%. However, when they are practically used, being influenced by the refractive index of materials formed on the electrodes (the orientated layer and the like), the refractivity is lowered to about 85% even when only the interface loss of this portion is taken into consideration.

When liquid crystal is used, a region called disclination leading to a lowered refractivity is formed and there are loss and absorption at the interfaces existing in the path of light from entering to leaving. Thus, if all of these are taken into consideration, the refractivity is lowered to be as low as about 40–70%.

Further, when the reflected picture is directly viewed, since the electrodes macroscopically form a mirror surface, it is very difficult to view the display as it is. Thus, conventionally, the surface of the pixel electrodes formed of a metal material are lightly etched and a fine uneven portion is formed on the surface. Display in white is materialized by optically scattering incident light by the uneven portion. It is to be noted that the quantity of reflected light to be observed is remarkably lowered due to the scattering action.

A conventional reflection layer (pixel electrodes) does not provide sufficient reflection and irregular reflection of light (including diffusion and scattering of light), and thus, has the problem in brightness of insufficient brightness for a liquid crystal display device (in particular, a direct viewing reflection type liquid crystal panel).

SUMMARY OF THE INVENTION

Accordingly, an object of the invention disclosed herein is to solve the above-mentioned problem and to provide a direct viewing type display device and a manufacturing process of the same, the display device having higher contrast and brighter display with the white portion being closer to the color of white paper by improving the electrode refractivity of a reflection type display device compared with a conventional one.

According to one aspect of the present invention disclosed herein, there is provided an electrooptical display device comprising at least one substrate, an electrooptical material, a first electrode on the substrate, and a second electrode for applying an electric field on the electrooptical material, characterized by further comprising a texture body on the first electrode, and a light reflection film on the texture body formed of a material having a higher refractive index than that of the texture body.

The above structure is characterized in that the texture body has on its surface an uneven portion for diffusing light, the uneven portion being 1 μm or less in height.

The above structure is characterized in that the light reflection film is flat and an uneven portion of the light reflection film is 0.3 μm or less in height.

The above structure is characterized in that an interlayer insulating film exists below the texture body, the interlayer insulating film being flat with an uneven portion of the interlayer insulating film being 0.3 μm or less in height.

The above structure is characterized in that the first electrode is formed of aluminum, a material with a main component thereof being aluminum, silver, or a material with a main component thereof being silver. The above structure is characterized in that the electrooptical material is formed of a nematic, a smectic, or a cholesteric liquid crystal material.

According to another aspect of the present invention disclosed herein, there is provided a reflection type electrooptical display device comprising a first substrate formed of a semiconductor substrate or an insulating substrate, a second substrate formed of a transparent substrate, and liquid crystal encapsulated between the substrates forming a pair, characterized in that a first electrode formed of a metal material, a texture body having a refractive index of 1.7 or less, and a light reflection film formed of a material having a higher refractive index than that of the texture body are provided on the first substrate, and in that a second electrode formed of a transparent material is provided on the second substrate.

In the above respective structures, when the film thickness and the refractive index of the texture body are given as $d_1$ and $n_1$, respectively, the film thickness $d_1$ is adjusted to satisfy 300 nm $\leq \lambda \leq$ 800 nm (wherein $\lambda = 4n_1 d_1$) in a part of or substantially all over the texture body.

In the above respective structures, when the film thickness and the refractive index of the light reflection film are given as $d_2$ and $n_2$, respectively, the film thickness $d_2$ is adjusted to satisfy 300 nm $\leq \lambda \leq$ 800 nm (wherein $\lambda = 4n_2 d_2$) in a part of or substantially all over the light reflection film.

The above respective structures are characterized in that the texture body is formed of $SiO_2$, $MgF_2$, $Na_3AlF_6$, an acrylic resin, or polyimide.

The above respective structures are characterized in that the light reflection film is formed of $TiO_2$, $ZrO_2$, $Ta_2O_5$, ZnS, ZnSe, ZnTe, Si, Ge, $Y_2O_3$, $Al_2O_3$, or Indium Tin Oxide.

DETAILED DESCRIPTION OF THE PREFERRED EMBODIMENTS

A reflection type liquid crystal display device according to the present invention varies, by applying voltage between a first electrode formed on a first substrate and an opposing electrode formed on a second substrate, the orientated state of liquid crystal to vary the polarized state or the transmittance of light, and, with zero to two polarizing plates combined (the number of the plates is selected depending on the operation mode of the liquid crystal or the like), controls the quantity of incident light and reflected light.

Figure 1:
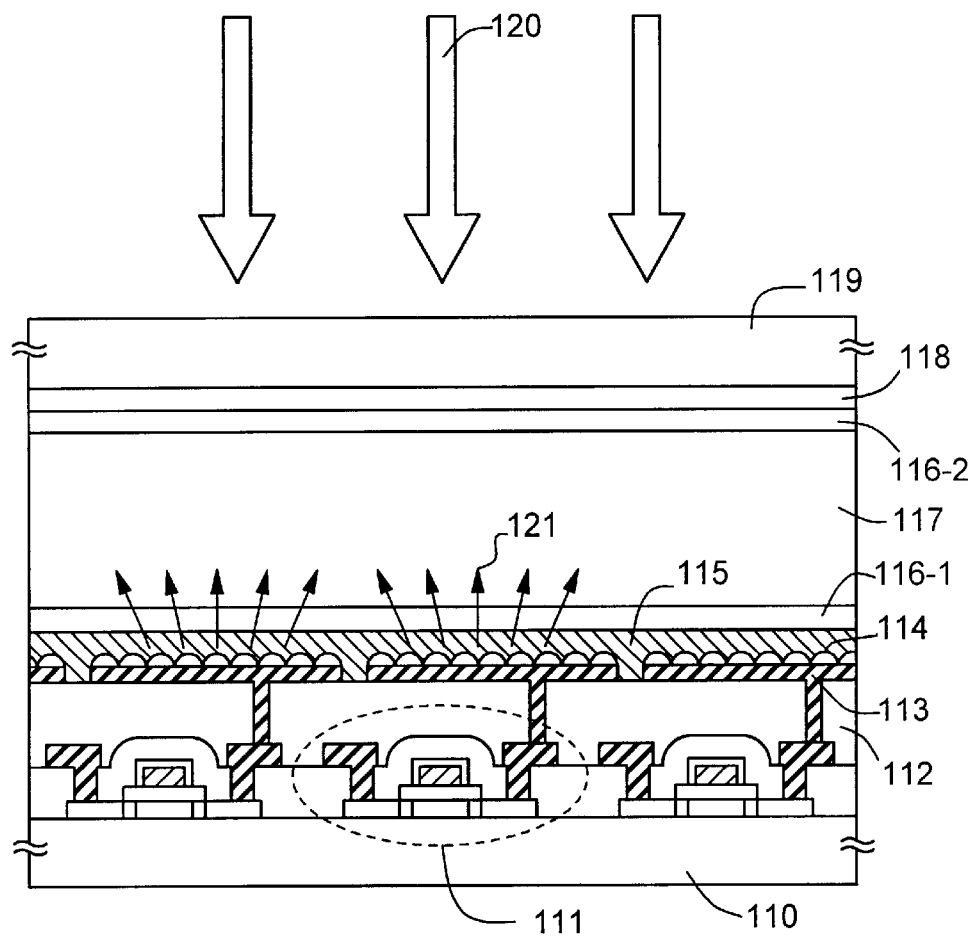
FIG. 1 is a view illustrating an example of a structure according to the present invention (Embodiment 1)
Figure 2:
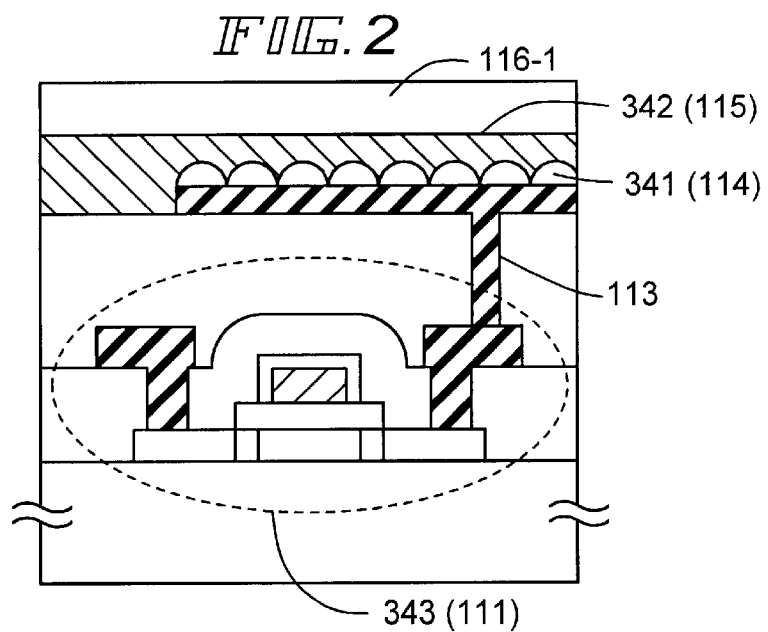
FIG. 2 is an enlarged view illustrating the example of a structure according to the present invention (Embodiment 1)

FIG. 1 is a schematic sectional view of an example of a structure according to the present invention. FIG. 2 is an enlarged schematic view of a pixel in FIG. 1.

In a liquid crystal display panel according to the present invention, switching elements 111, an interlayer insulating film 112, pixel electrodes 113, a texture body 114, a light reflection film 115, an orientated layer 116-1, a liquid crystal layer 117, an orientated layer 116-2, and an opposing electrode 118 are formed between a substrate 110 and an opposing substrate 119 in this order from the side of the substrate 110.

The pixel electrodes 113 are disposed to be matrix-like on the substrate 110 through the interlayer insulating film 112, and are connected to the switching elements 111 such as thin film transistors. The pixel electrodes are formed of a metal material having a sufficient refractivity, for example, a material a main component of which is aluminum or silver. Incident light is reflected by the surface of the pixel electrodes and by the texture body and the light reflection film provided thereon.

A first characteristic of the present invention is the provision of the texture body 114 (shaped to have on its surface an uneven portion for scattering light) on the pixel electrodes. FIGS. 5 to 8 are examples of the shape of the texture body according to the present invention. Though the shapes shown in FIGS. 5 to 8 are regularly disposed, they may be randomly disposed.

A texture body as used herein refers to a three-dimensional minute optical system which controls by its shape the reflection angle or the transmission angle to determine the degree of scatter and the scattering direction inside and outside an interface portion. It is to be noted that the shape in section of the uneven portion of the texture body of the present invention is circles, rings, triangles, squares, pentagons, hexagons, octagons, rectangles, ovals, or a combination thereof.

In the liquid crystal display device of the present invention, the first electrode mentioned above is a reflection electrode. According to the present invention, the uneven portion of the texture body 114 provided on the reflection electrode scatters incident light 120. Conventionally, the surface of the reflection electrode is directly processed in order to scatter incident light.

The difference in height in the uneven portion of the texture body mentioned above (the vertical distance between the top of a convex portion and the bottom of a concave portion) is on the order of several $\mu$m or less than 1 $\mu$m. However, too much height difference in the uneven portion prevents the liquid crystal from keeping a constant thickness when the liquid crystal panel is formed. So, the display characteristics of the liquid crystal display is deteriorated. Therefore, it is preferable to flatten an uneven portion on the surface of the interlayer insulating film below the texture body such that the difference in height thereof is 0.3 $\mu$m or less.

It is to be noted that the texture body of the present invention also functions as a protective film for preventing the pixel electrodes from corroding.

The methods of forming the texture body of the present invention are enumerated such as etching, photolithography for forming the uneven portion and then heat treatment for leveling the uneven portion, preparing the texture body using a die made of a high heat-resistant material, and the like, and the methods are not particularly limited.

A second characteristic of the present invention is the provision of the light reflection film 115 on the texture body having a higher refractive index than that of the texture body. This structure can obtain an enhanced reflection effect by interference at the interface between the texture body 114 and the light reflection film 115.

As the material for the light reflection film, among materials having high indices of refraction between 1.8 to 6.0 to the wavelength of incident light, $TiO_2$, $ZrO_2$, $Ta_2O_5$, ZnS, ZnSe, ZnTe, Si, Ge, $Y_2O_3$, $Al_2O_3$ or the like may be used. Alternatively, as another material having a high refractive index, a transparent conductive film such as Indium Tin Oxide (refractive index: 1.98) may be used. In the case where such a transparent conductive film is used as the light reflection film, patterning is necessary, and its contact with the pixel electrodes can eliminate dielectric loss.

Further, when a material having a high refractive index is used for the texture body, the great loss of light makes it difficult to obtain a desired refractivity. Therefore, it is preferable to use, as the material for the texture body, $SiO_2$, $MgF_2$, $Na_3AlF_6$, or the like which are materials having low indices of refraction having a ratio of 0.7 or less to the refractive index of the light reflection film. It is to be noted that, other than the above-mentioned, an orientated layer, an acrylic resin, and polyimide (refractive index: 1.5–1.6) may also be used as the material.

Incidentally, in the present invention, for the purpose of using the texture body and the light reflection film as reflection enhancement films and of controlling reflection and scatter at the interface between the reflection electrode and the texture body, it is necessary to adjust the shapes and the film thickness of the texture body and the light reflection film such that a $\lambda/4$ film is formed with regard to a necessary central wavelength. The $\lambda/4$ film as used herein refers to a film which satisfies the relationship of nd =$\lambda/4$ wherein the refractive index is n, the film thickness is d, and the central wavelength is $\lambda$. It is to be noted that, though the central wavelength of the texture body may be the same as that of the light reflection film (550 nm, for example), flat spectral characteristics are more easily obtained in the range of visible radiation when they are different (450 nm with regard to the texture body and 650 nm with regard to the reflection film, for example).

According to the result of experiments by the inventors of the present invention, provision of the texture body and the light reflection film on the pixel electrodes had almost no influence of dielectric loss on the threshold characteristics and the response speed of the liquid crystal in practical aspects, since the formed film thickness is 200 nm or thinner.

Further, in the present invention, it is easy to appropriately change the film thickness and the materials of the texture body and the light reflection film to selectively set the reflection wavelength.

A third characteristic of the present invention is to flatten the uneven portion of the texture body by the light reflection film. This makes it possible to improve the flatness and to make the film thickness of the liquid crystal uniform when the liquid crystal panel is formed. The flattening methods are enumerated such as an application of a light reflection film with a spinner or the like, and a flattening process with CMP, (Chemical Mechyanical Polish) and the like. Further, the retardation value which is an optical parameter for liquid crystal operated by birefringence can be made uniform. Thus, display deterioration such as uneven color can be prevented. Further, influence on rubbing is eased to make even the orientation of the liquid crystal, which makes it possible to suppress accompanying disclination and the like.

The methods of forming the light reflection film are enumerated such as sputtering, an coating method, vacuum evaporation, and the like, and the methods are not particularly limited. In the present invention, it is preferable to use the coating method with which the light reflection film provided on the texture body has a flat surface. In case vacuum evaporation is used, it is preferable to perform flattening process with CMP or the like.

It is to be noted that, when the light reflection film is applied with a spinner or the like, in the case where the ratio of diffusion at the texture body and the reflection electrode portion is increased, the film thickness of the light reflection film is brought closer to a $\lambda/2$ film from the $\lambda/4$ film. The $\lambda/2$ film as used herein refers to a film which satisfies the relationship of nd=$\lambda/2$ wherein the refractive index is n, the film thickness is d, and the central wavelength is $\lambda$.

According to the present invention, by providing the above-mentioned texture body on the pixel electrodes, the irregular reflection of light can be improved. Further, by forming a reflection film by laminating the light reflection film having a high refractive index, the refractivity is increased. In addition, decrease in the refractivity due to the orientated film and the uneven portion, which is a conventional problem, can be suppressed. With the present invention, refractivity of 90% or higher can be easily obtained in the air.

(Embodiment 1)

In the present embodiment, an example of a process of preparing a pixel matrix circuit of a reflection type LCD using the present invention is described with reference to FIGS. 3A to 4C. It is to be noted that, since the present invention relates to a technique with regard to a reflection film comprising a texture body and a light reflection film provided on pixel electrodes, the structure of switching elements, for example, the structure of TFTs itself is not limited to the present embodiment. Of course, the present invention can also be applied to a passive type LCD.

First, a substrate 301 having an insulating surface is prepared. The substrate may be a glass substrate, a quartz substrate, a ceramic substrate, or a semiconductor substrate, and a glass substrate is used in the present embodiment. Next, an under film (not shown) is provided on the substrate. The under film may be a silicon oxide film, a silicon nitride film, or a silicon nitride oxide film at the thickness of 100–300 nm. In the present embodiment, a silicon oxide film at the thickness of 200 nm is formed using TEOS as the material. It is to be noted that the under film may be eliminated if the substrate is, for example, a quartz substrate having sufficient flatness.

Next, active layers are formed on the substrate or on the under film. The active layers may be formed of a crystalline semiconductor film (typically, a crystalline silicon film) at the thickness of 20–100 nm (preferably, 25–70 nm). The crystalline silicon film may be formed by any known means such as laser crystallization, thermal crystallization. In the present embodiment, a catalyst element (nickel) is added at the time of crystallization for promoting crystallization. This technique is disclosed in detail in Japanese Patent Laid-open No. Hei 7-130652, No. Hei 9-312260, and the like. The crystalline silicon film is patterned by an ordinary photolithography process to obtain active layers 302–304 at the thickness of 50 nm. It is to be noted that, though only three TFTs are described in the present embodiment, actually, more than a million TFTs are formed in the pixel matrix circuit.

Next, as a gate insulating film 305, a silicon oxide film is formed at the thickness of 150 nm. The gate insulating film 305 may be a silicon oxide film, a silicon nitride film, a silicon oxide nitride film, or a laminated film thereof at the thickness of 100–300 nm. After that, a film (not shown) a main component of which is aluminum is formed on the gate insulating film using a target including 0.2 wt % of scandium, and island-like patterns to be gate electrodes are formed by patterning.

The present embodiment utilizes techniques described in Japanese Patent Laid-open No. Hei 7-135318. See the above-identified document for further detail.

First, anodic oxidation is carried out in a 3% aqueous solution of oxalic acid with a resist mask used for the patterning left on the island patterns. Here, forming current of 2–3 mV is sent with a platinum electrode being as the cathode, and the arrival voltage is 8 V. In this way, porous anodic oxidation films 306–308 are formed.

Then, after the resist mask is removed, anodic oxidation is carried out in a 3% ethylene glycol solution of tartaric acid neutralized by ammonia water. Here, the forming current is 5–6 mv, and the arrival voltage is 100 V. In this way, dense anodic oxidation films 309–311 are formed.

Figure 3A:
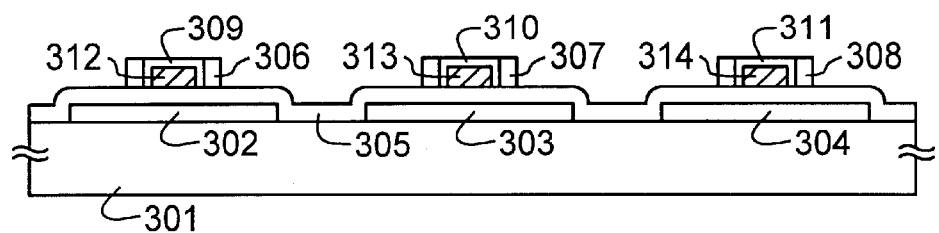
FIGS. 3A to 3D are views illustrating an example of a preparing process of the embodiment (Embodiment 1)

By the above process, gate electrodes 312–314 are defined. It is to be noted that, in a pixel matrix circuit, simultaneously with the formation of the gate electrodes, gate lines each of which is connected to the respective gate electrodes are formed (FIG. 3A).

Next, the gate insulating film 305 is etched with the anodic oxidation films 306–311 and the gate electrodes 312–314 being the mask. The etching is carried out by dry etching using CHF$_3$ gas. In this way, gate insulating films of shapes denoted by 315–317 are formed.

The anodic oxidation films 306–308 are removed by etching. In this state, impurity ions for giving one type of conductivity are added by ion implantation or plasma doping. In this case, if the pixel matrix circuit is formed of N type TFTs, P (phosphorus) ions are added, and if the pixel matrix circuit is formed of P type TFTs, B (boron) ions are added.

It is to be noted that the impurity ions are added in two steps. The first step is carried out under high acceleration voltage of about 80 keV, and adjustment is made such that the peak of the impurity ions comes under the end portions (protruding portions) of the gate insulating films 315–317. Then, the second step is carried out under low acceleration voltage of about 5 keV, and adjustment is made such that the impurity ions are not added under the end portions (the protruding portions) of the gate insulating films 315–317.

Figure 3B:
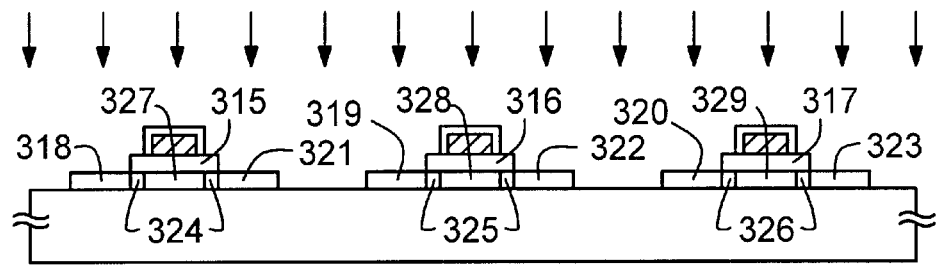

In this way, source regions 318–320, drain regions 321–323, lightly doped impurity regions (also referred to as LDD regions) 324–326, and channel formation regions 327–329 of the TFTs are formed (FIG. 3B).

Here, it is preferable that the impurity ions are added to the source/drain regions such that sheet resistance of 300–500 $\Omega/\Delta$ can be obtained. Further, the lightly doped impurity regions have to be optimized depending on the performance of the TFTs. After the process of adding the impurity ions ends, thermal treatment is carried out to activate the impurity ions.

Figure 3C:
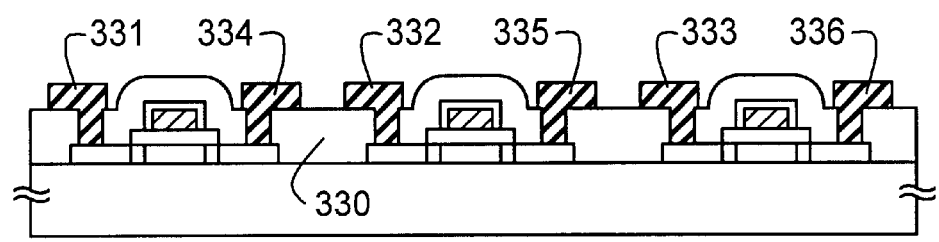

Next, a silicon oxide film is formed at the thickness of 400 nm as a first interlayer insulating film 330, and source electrodes 331–333 and drain electrodes 334–336 are formed on the first interlayer insulating film 330 (FIG. 3C). It is to be noted that, other than the silicon oxide film, a silicon oxide nitride film or other insulating materials may be used as the first interlayer insulating film.

It is to be noted that in FIG. 3C, elements formed in a region denoted by 343 in FIG. 2 are herein referred to as switching elements (typically, TFT or MIM devices). In this specification, an interlayer insulating film 337 to be formed later and pixel electrodes are not included in the structure of the switching elements.

Figure 3D:
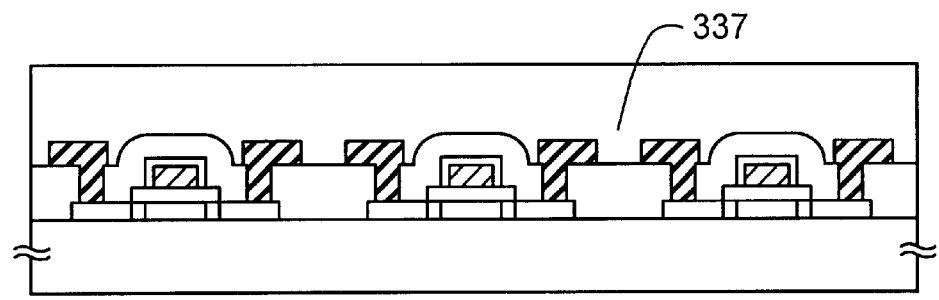

Next, a silicon oxide film is formed at the thickness of 0.5–1 $\mu$m as a second interlayer insulating film 337. As the second interlayer insulating film 337, a silicon oxide nitride film, an organic resin film, or the like may also be used. As the organic resin film, polyimide, polyamide, polyimidcamide, an acrylic resin, or the like may be used. In the present embodiment, an acrylic resin film is formed at the thickness of 1 $\mu$m (FIG. 3D).

Next, contact holes are formed by etching.

Figure 4A:
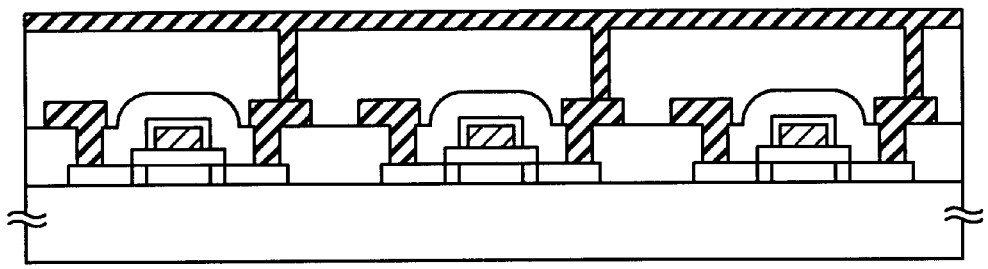
FIGS. 4A to 4C are views illustrating an example of the preparing process of the embodiment (Embodiment 1)

Then, an aluminum film is formed at the thickness of 100 nm using a target added with 1 wt % of titanium, and pixel electrodes 338–340 are formed by patterning. In this way, a state shown in FIG. 4A is obtained.

Figure 4B:
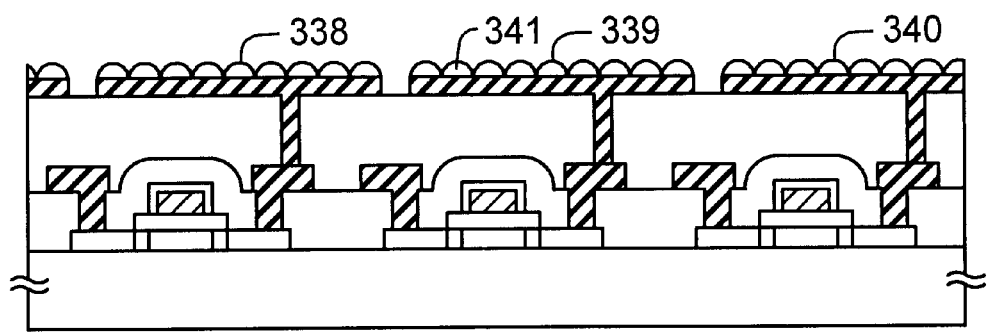

Next, the texture body is formed on the pixel electrodes. In the present embodiment, an uneven portion is formed in a silicon oxide film to be the texture body. The uneven portion is formed by photolithography. Since the uneven portion is formed using a mask, the shape of the uneven portion. especially the depth of the concave portions is constant (about several dozen nm–100 nm) (FIG. 4B).

In the case that the texture body is combined with a light reflection film which is to be formed in a later process to form a light reflection layer, the film thickness is required to be adjusted such that a $\lambda/4$ film is formed. It is to be noted that heat treatment may be additionally carried out to adjust the shape.

Next, the light reflection film is formed so as to cover the texture body having the uneven portion on the surface. The thickness of the light reflection film has to be adjusted. It is to be noted that the thickness of the layer is adjusted such that a $\lambda/4$ film is formed with regard to the central wavelength of the necessary reflection wavelength range.

As the material for the texture body, $SiO_2$, $MgF_2$, $Na_3AlF_6$, or the like which are materials having low indices of refraction may be used. It is to be noted that, other than the above-mentioned, an orientated layer, an acrylic resin, and polyimide (refractive index: 1.5–1.6) may also be used as the material.

As the material for the light reflection film having a high refractive index, $TiO_2$, $ZrO_2$, $Ta_2O_5$, ZnS, ZnSe, ZnTe, Si, Ge, $Y_2O_3$, $Al_2O_3$ or the like may be used. Alternatively, a transparent conductive film 30 such as Indium Tin Oxide (refractive index: 1.98) may be used.

In the present embodiment, $TiO_2$ (refractive index: 2.2) is used for the light reflection film while $SiO_2$ (refractive index: 1.43) is used for the texture body.

Figure 4C:
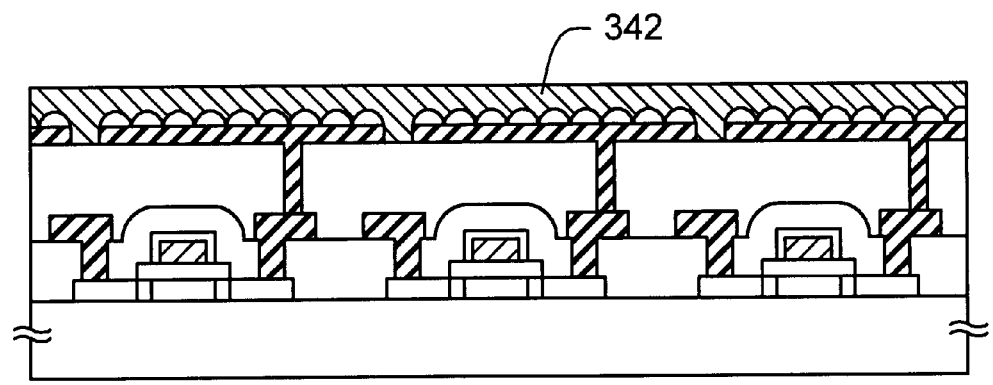

The film thickness of the texture body and that of the light reflection film are adjusted such that a $\lambda/4$ film is formed in the range of visible radiation (400 nm<$\lambda$<700 nm). The range of the film thickness of the texture body ($SiO_2$) which forms a $\lambda/4$ film in the above range of visible radiation is 70 nm–122 nm. The range of the film thickness of the light reflection film ($TiO_2$) which forms a $\lambda/4$ film in the above range of visible radiation is 45.5 nm–79.5 nm. By adjusting the film thickness in this way, light in the necessary reflection wavelength range are enhanced with one another by an interference effect and can be effectively reflected. In the present embodiment, the thickness of the texture body is about 70 nm while the thickness of the laminated light reflection film is about 50 nm (FIG. 4C).

It is to be noted that of course the present invention is not limited to the materials and thickness of the respective dielectric films, and their respective thickness and materials may be appropriately varied to selectively set the reflection wavelength.

Further, it is preferable that the film thickness corresponds to the central wavelength $\lambda_1$=400–500 nm of the reflection wavelength range of the texture body ($SiO_2$) and the film thickness corresponds to the central wavelength $\lambda_2$=450–700 nm of the reflection wavelength range of the light reflection film ($TiO_2$), since a high mean refractivity can be obtained in the range of visible radiation.

By adjusting the film thickness in this way, light in the necessary reflection wavelength range are enhanced with one another by an interference effect and can be effectively reflected. It is to be noted that the dielectric multilayer film in the present embodiment is so thin that the voltage loss practically causes no problem.

Figure 5:
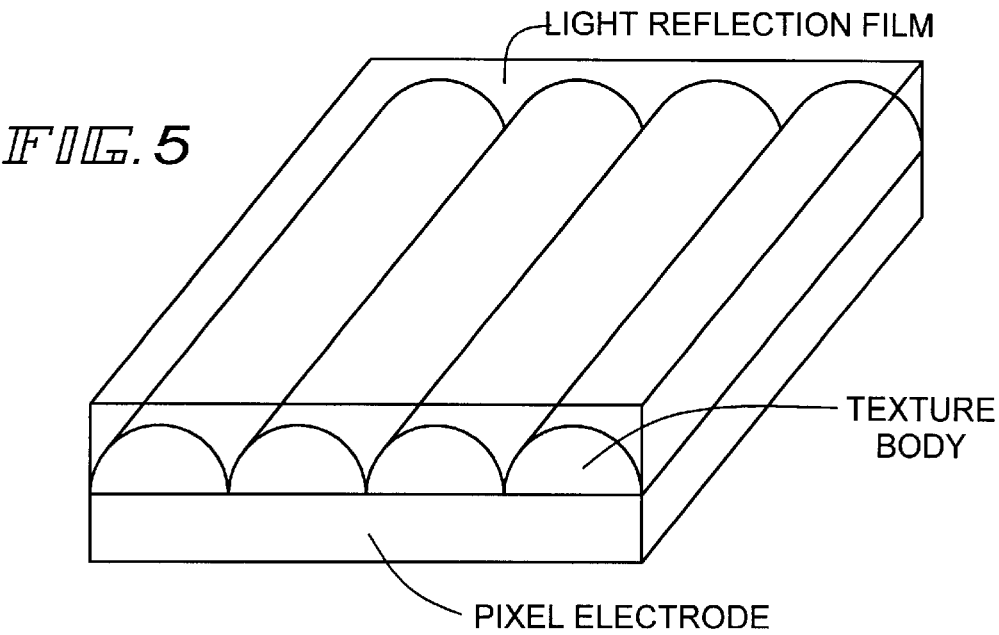
FIG. 5 is a view illustrating an example of a part of a pixel according to the present invention (Embodiment 1)
Figure 6:
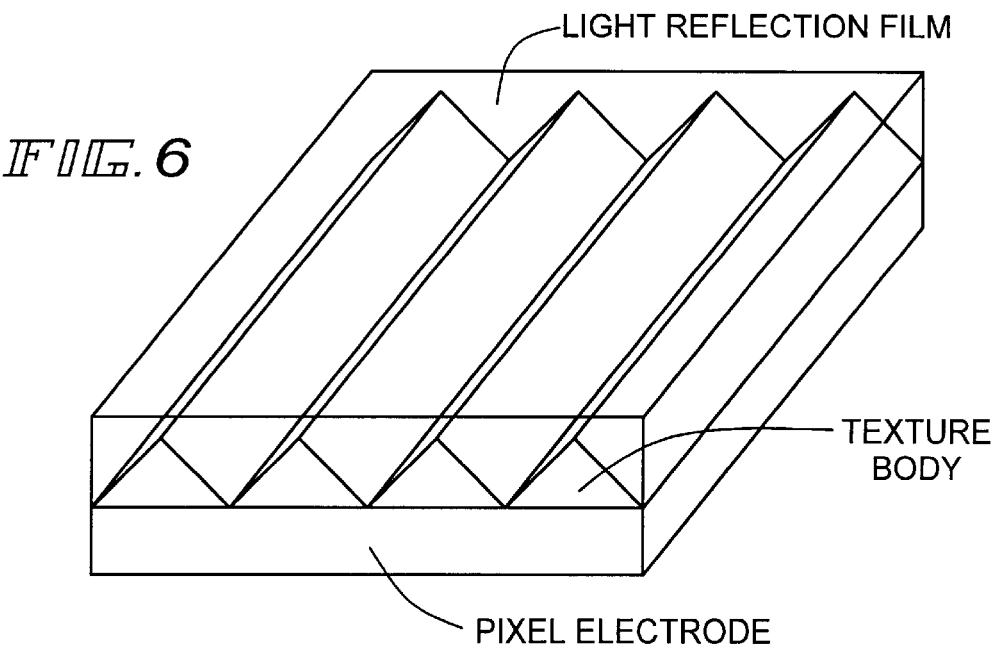
FIG. 6 is a view illustrating an example of a part of the pixel according to the present invention (Embodiment 1)
Figure 7:
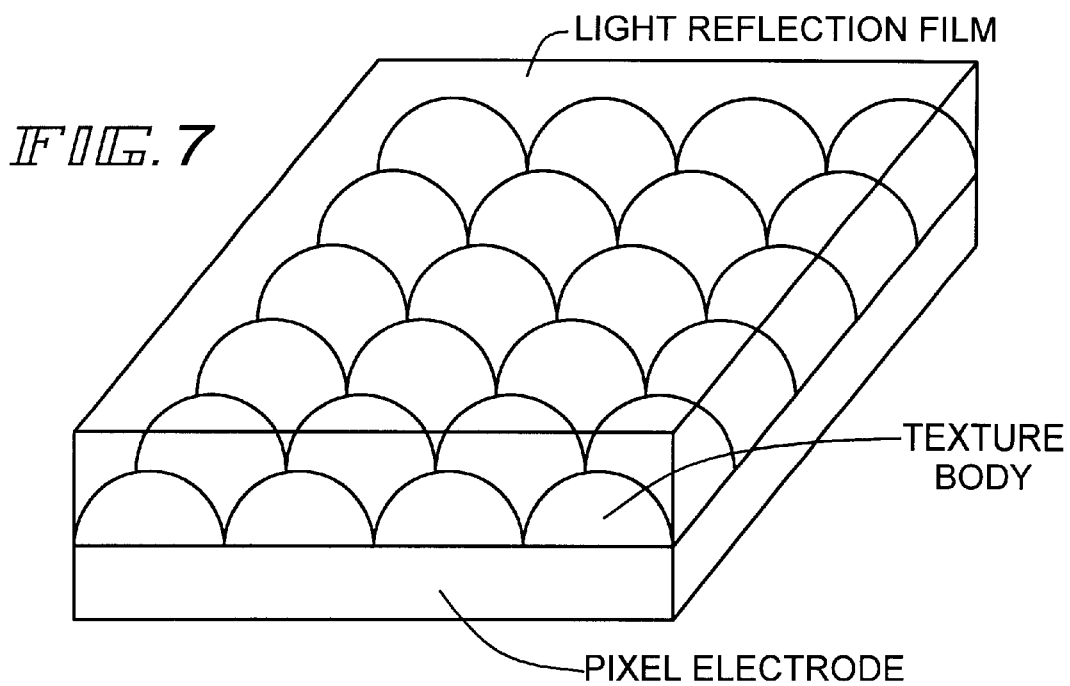
FIG. 7 is a view illustrating an example of a part of the pixel according to the present invention (Embodiment 1)
Figure 8:
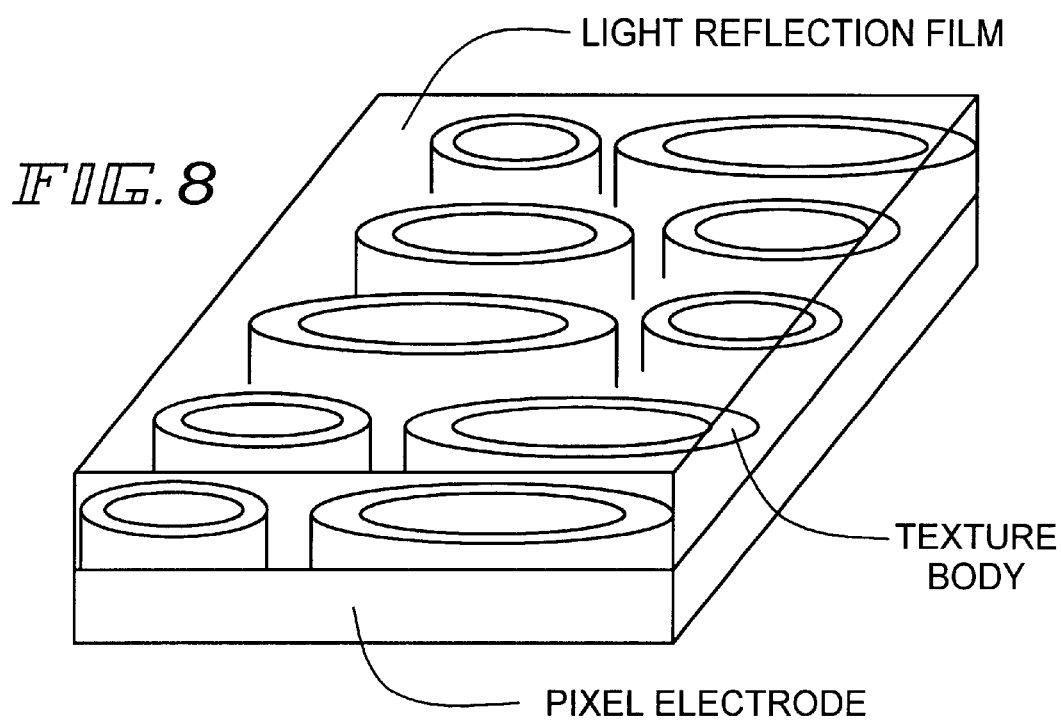
FIG. 8 is a view illustrating an example of a part of the pixel according to the present invention (Embodiment 1)

It is to be noted that, in the present embodiment, since the flatness of the light reflection film provided on the texture body is important, the coating method is used. The shape of the texture body is adjusted such that the thickness of the light reflection film forms a $\lambda/4$ to $\lambda/2$ film to determine the scattering strength and the scattering direction. The method of forming the dielectric multilayer film is not limited to the present embodiment, and sputtering, vacuum evaporation, or the like may be used. FIG. 5 is a partial enlarged perspective view of a pixel electrode. Further, it is preferable that the shape of the texture body is as shown in FIGS. 6–8.

Next, an orientated layer is formed using a known method.

In this way, the pixel matrix circuit is completed. Practically, a driver circuit for driving pixel TFTs and the like are simultaneously formed on the same substrate. Such a substrate is generally referred to as a TFT side substrate or an active matrix substrate. Such an active matrix substrate is herein referred to as a first substrate.

After the first substrate is completed, an opposing substrate which is a light-transmitting substrate with an opposing electrode formed thereon (herein referred to as a second substrate) is applied to the first substrate, and a liquid crystal layer is encapsulated therebetween. In this way, the reflection type LCD is completed.

It is to be noted that this process of fabricating a cell can be carried out in a known method. Further, it is also possible to disperse a dichromatic pigment in the liquid crystal layer or to provide a color filter on the opposing substrate. The kind of the liquid crystal layer and whether such a color filter is provided or not can change depending on the mode of driving the liquid crystal, and may be appropriately determined when the present invention is implemented.

FIG. 1 shows the reflection type LCD obtained according to the above-mentioned preparing process. FIG. 1 is a schematic sectional view of the present embodiment.

In the liquid crystal display panel prepared as the present embodiment, the switching elements 111, the interlayer insulating film 112, the pixel electrodes 113, the texture body 114, the light reflection film 115, the orientated layer 116-1, the liquid crystal layer 117, the orientated layer 116-2, and the opposing electrode 118 are formed between the substrate 110 and the opposing substrate 119 in this order from the side of the substrate 110.

It is to be noted that switching elements as used herein refers to elements prepared in the process shown in FIG. 3C. That is, elements with the source electrodes 331–333 and the drain electrodes 334–336 provided therewith are defined as switching elements.

FIG. 1 corresponds to FIGS. 3A to 4C. The interlayer insulating film 112 in FIG. 1 corresponds to the second interlayer insulating film 337 in FIG. 3D; the pixel electrodes 113 in FIG. 1 corresponds to the pixel electrodes 338–340 in FIG. 4B; the texture body 114 in FIG. 1 corresponds to a texture body 341 in FIG. 4B; and the light reflection film 115 in FIG. 1 corresponds to a light reflection film 342 in FIG. 4C.

The refractivity in the air of the present embodiment (the pixel electrodes+the texture body with the uneven portion on the surface+the light reflection film+the orientated layer) can be made to be 90% or more–less than 100%, and decrease in the refractivity due to the uneven portion and the orientated layer can be prevented.

Further, compared with a conventional one (the pixel electrodes+the orientated layer), the degree of the irregular reflection is increased to improve the brightness of the display.

Though not shown in the present embodiment, the structure may have a color filter disposed between the opposing substrate and the opposing electrode.

(Embodiment 2)

In the present embodiment, an example will be described where TFTs differently structured from the TFTs in Embodiment 1 are used as the semiconductor devices for carrying out the active matrix driving. It is to be noted that the TFTs described in the present embodiment can be easily applied to the above respective embodiments.

Figure 10:
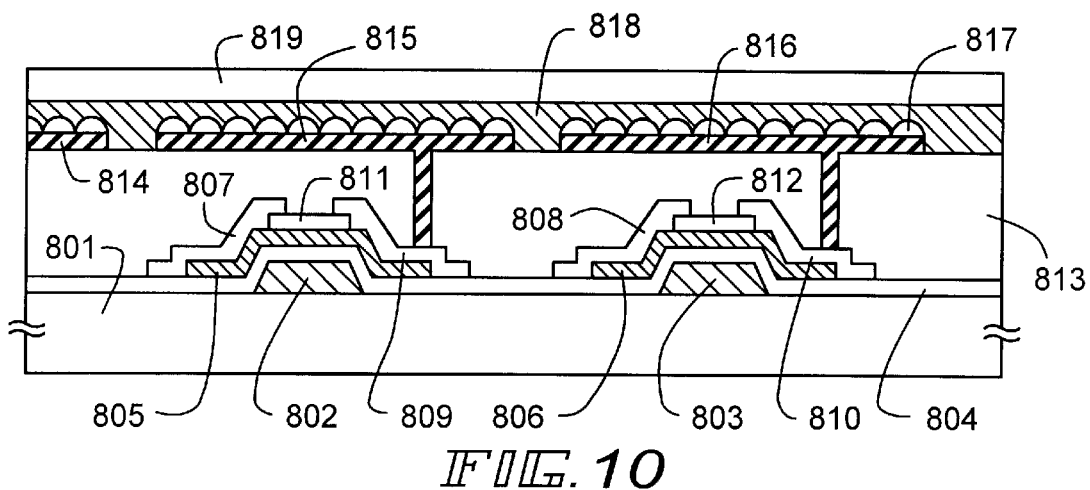
FIG. 10 is a view illustrating an example of a structure according to the present invention (Embodiment 2)

Though, in Embodiment 1, coplanar type TFTs which are typical top-gate type TFTs are described as an example, the TFTs may be bottom-gate type TFTs. FIG. 10 shows an embodiment where reverse stagger type TFTs which are typical bottom-gate type TFTs are used.

In FIG. 10, 801 denotes a glass substrate, 802 and 803 denote gate electrode, 804 denotes a gate insulating film, and 805 and 806 denote active layers. The active layers 805 and 806 are formed of silicon films to which, intentionally, impurity is not added.

807 and 808 denote source electrodes, 809 and 810 denote drain electrodes, and 811 and 812 denote silicon nitride films to be channel stoppers (or etching stoppers). More specifically, the regions of the active layers 805 and 806 located below the channel stoppers 811 and 812 substantially function as channel formation regions.

The above is the basic structure of reverse stagger type TFTs.

In the present embodiment, such reverse stagger type TFTs are covered with an interlayer insulating film 813 formed of an organic resin film, and pixel electrodes 814, 815, 816 are formed thereon to form a texture body 817. Of course, a light reflection film 818 is formed on the texture body 817. 819 denotes an orientated layer.

Next, an example will be described where insulated gate field effect transistors (IGFETs) are formed as a semiconductor device of the present invention. It should be noted that IGFETs refer to transistors formed on a silicon wafer and are sometimes called MOSFETs.

Figure 11:
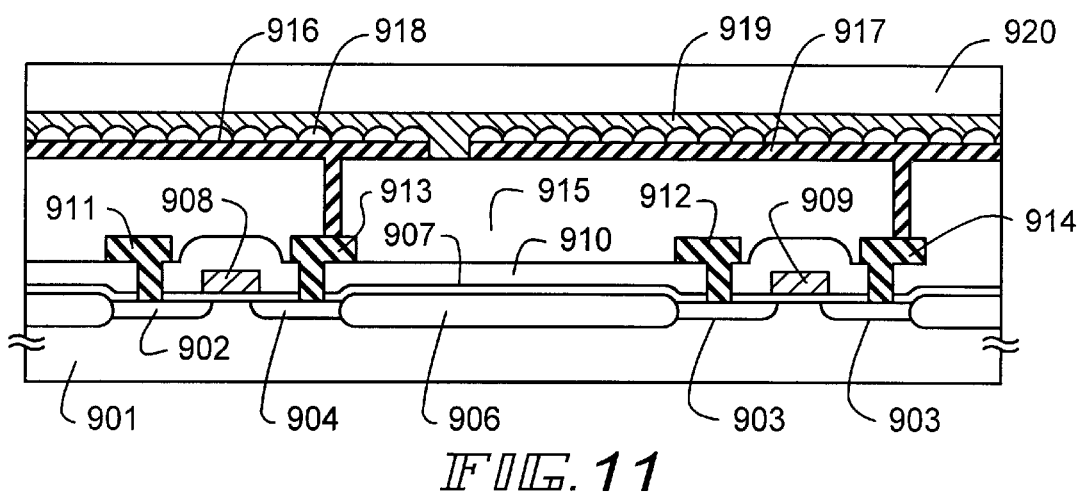
FIG. 11 is a view showing an outside appearance of a liquid crystal panel (Embodiment 2)
Figure 12:
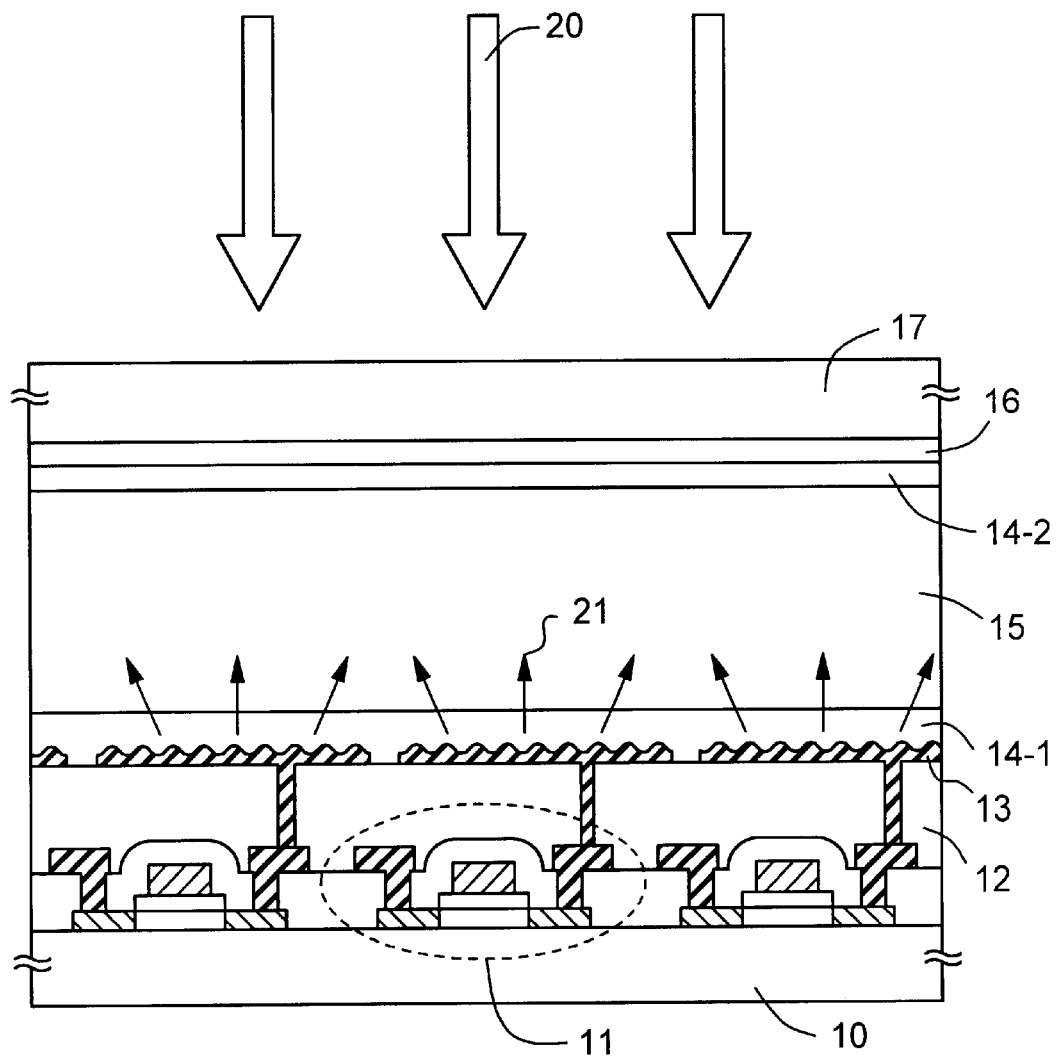
FIG. 12 is a view illustrating a conventional structure.

In FIG. 11, 901 denotes a glass substrate, 902 and 903 denote source regions, and 904 and 905 denote drain regions. The source /drain regions can be formed by adding impurity by ion implantation and by thermal diffusion. Incidentally, 906 denotes oxide for separating the devices, and can be formed using ordinary LOCOS technique.

Reference numeral 907 denotes a gate insulating film, 908 and 909 denote gate electrodes, 910 denotes a first interlayer insulating film, 911 and 912 denote source electrodes, and 913 and 914 denote drain electrodes. A second interlayer insulating film 915 is formed on them for flattening, and pixel electrodes 916 and 917 are formed on the flat surface. A texture body 918 is formed on the surface of the pixel electrodes using Embodiment 1, which is covered with a light reflection film 919, 920 denotes an orientated layer.

It is to be noted that the present invention is also applicable to an active matrix display using, other than the IGFETs, top-gate type TFTs and bottom-gate type TFTs described in the present embodiment, thin film diodes, MIM (Metal Insulator Meta) devices, and varistor devices.

As described in the present embodiment, the present invention is applicable to reflection type LCDs using semiconductor devices of any structure.

(Embodiment 3)

Figure 9A:
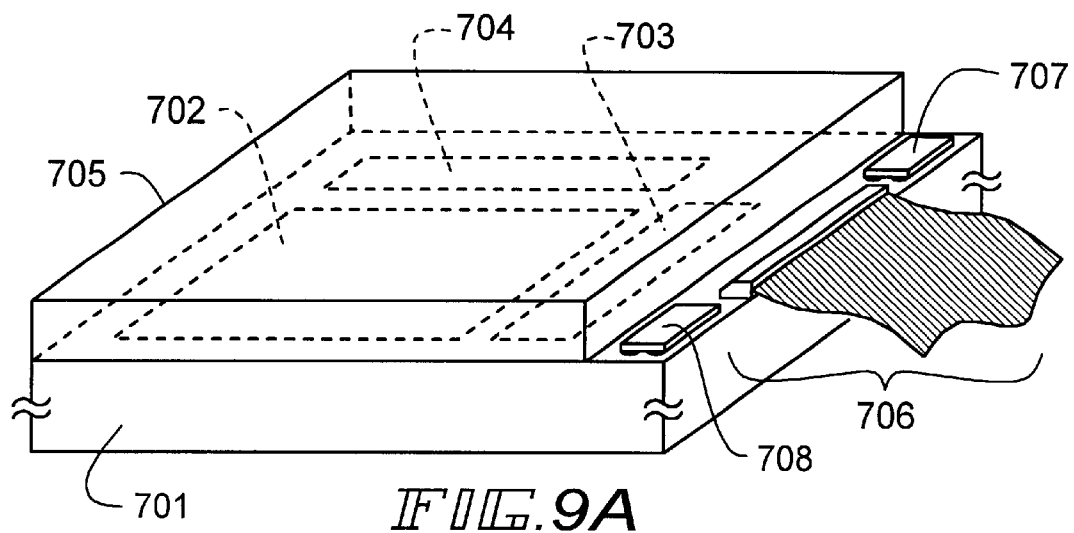
FIGS. 9A and 9B are views illustrating an example of a structure according to the present invention (Embodiment 3)
Figure 9B:
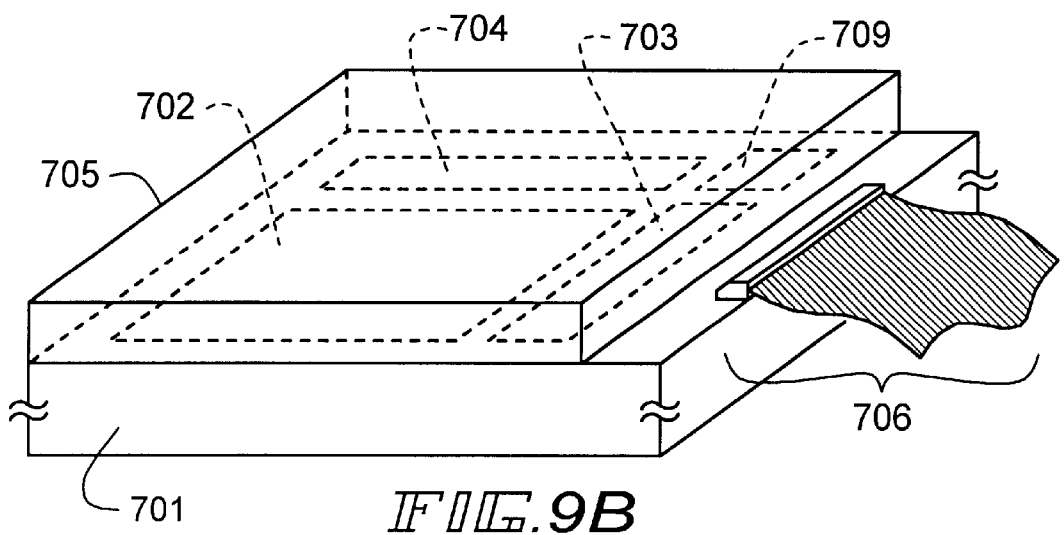

An example will be described where an AMLCD (Active Matrix Liquid Crystal Display) is formed using a first substrate (a substrate on the device formation side) including the structure described in Embodiment 1 or 2. FIGS. 9A and 9B shows an outside appearance of the AMLCD of the present embodiment.

In FIG. 9A, reference numeral 701 denotes an active matrix substrate that has a pixel matrix circuit 702, a source side driver circuit 703, and a gate side driver circuit 704 formed thereon. It is preferable that the driver circuits are formed of CMOS circuits which are complementary combinations of N type TFTs and P type TFTs. 705 denotes an opposing substrate.

In the AMLCD shown in FIG. 9A, the opposing substrate 705 is applied to the active matrix substrate 701 with the end faces being registered. However, a part of the opposing substrate 705 is removed, and the exposed portion of the active matrix substrate is connected to an FPC (a flexible print circuit) 706. An external signal is transmitted to the inside of the circuit through the FPC 706.

Further, IC chips 707 and 708 are attached utilizing the surface to which the FPC 706 is attached. These IC chips are formed by forming on a silicon substrate various circuits such as a video signal processing circuit, a timing pulse generating circuit, a γ correction circuit, a memory circuit, and an arithmetic circuit. Though two IC chips are attached in FIG. 9A, only one IC chip may be attached, or a plurality of those IC chips may be attached.

Further, the structure shown in FIG. 9B is also possible. In FIG. 9B, like reference numerals designate corresponding parts in FIG. 9A. Here, an example where a logic circuit 709 formed of TFTs on the same substrate performs signal processing which is, in FIG. 9A, performed by the IC chips. In this case, the logic circuit 709 is, similarly to the driver circuits 703 and 704, formed based on a CMOS circuit.

Further, a color filter may be used for color display, or the liquid crystal may be driven in an ECB (electric-field control birefringence) mode, a GH (guest host) mode, or a polymer dispersion type liquid crystal (PDLC) without using a color filter.

(Embodiment 4)

CMOS circuits and pixel active matrix circuits produced by the embodiments of the present invention can be applied to a plurality of electro-optical devices (e.g. an active matrix type liquid crystal display. That is, the present invention can be carried out for all the electric apparatus including such the electro-optical devices as display media.

As such electronic apparatus, a video camera, a digital camera, a projector (rear type or front type), a head mount display (a goggle type display), a car navigation system, a personal computer, a portable information terminal (mobile computer, portable telephone, electric book, etc.) and the like (ire enumerated. Examples of those are shown in FIGS. 13A to 13J.

Figure 13A:
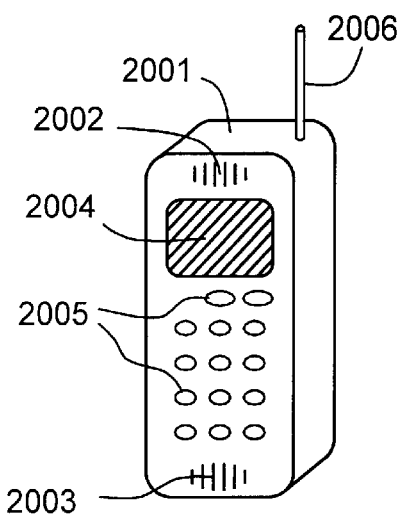
FIGS. 13A–13J are electric apparatus including the device according to the present invention (Embodiment 4).

FIG. 13A shows a portable telephone which is constituted by a main body 2001, an audio input portion 2002, an audio input portion 2003, a display device 2004, operation switches 2005, and an antenna 2006. The present invention can be applied to the audio input portion 2002, the audio input portion 2003, the display device 2004, and other signal control circuits.

Figure 13B:
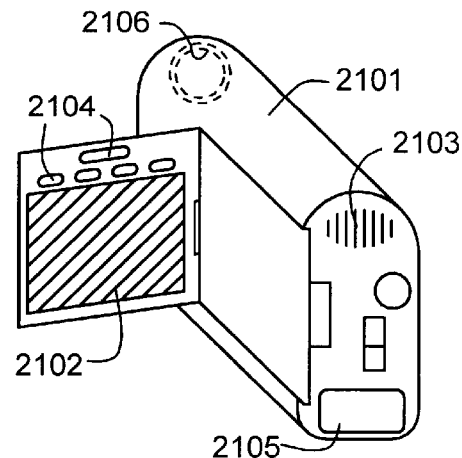

FIG. 13B shows a video camera which is constituted by a main body 2101, a display device 2102, an audio input portion 2103, an operation switch 2104, a battery 2105, and an image receiving portion 2106. The present invention can be applied to the display device 2102, the audio input portion 2103, and other signal control circuits.

Figure 13C:
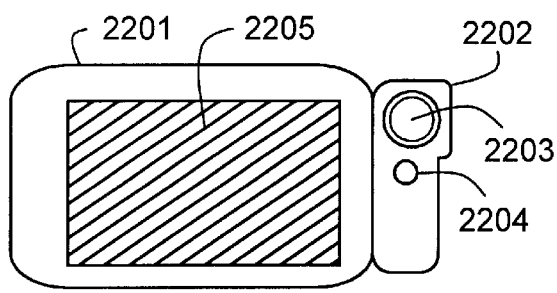

FIG. 13C shows a mobile computer which is constituted by a main body 2201, a camera portion 2202, an image receiving portion 2203, an operation switch 2204, and a display device 2205. The present invention can be applied to the display device 2205 and other signal control circuits.

Figure 13D:
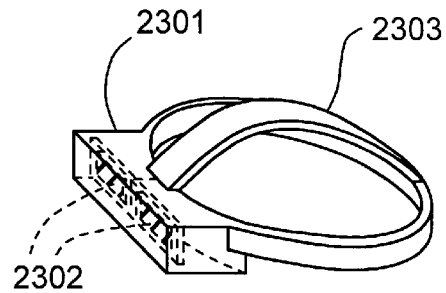

FIG. 13D shows a head mount display which is constituted by a main body 2301, a display device 2302, and an arm portion 2303. The present invention can be applied to the display device 2302 and other signal control circuits.

Figure 13E:
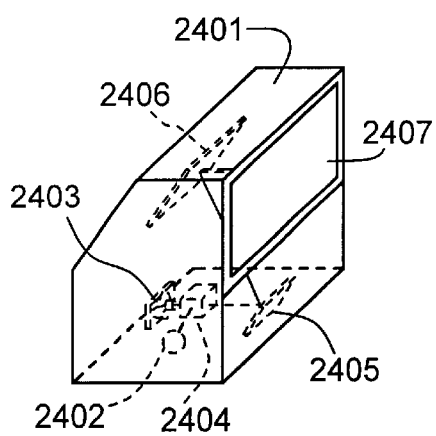

FIG. 13E shows a rear type projector which is constituted by a main body 2401, a light source 2402, a display device 2403, a polarizing beam splitter 2404, reflectors 2405 and 2406, and a screen 2407. The present invention can be applied to the display device 2403 and other signal control circuits.

Figure 13F:
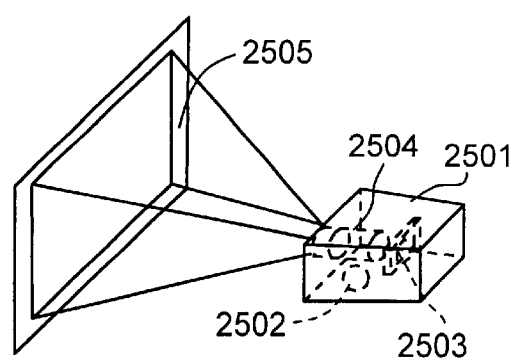

FIG. 13F shows a front type projector which is constituted by a main body 2501, a light source 2502, a display device 2503, an 2404, and a screen 2505. The present invention can be applied to the display device 2503 and other signal control circuits.

Figure 13G:
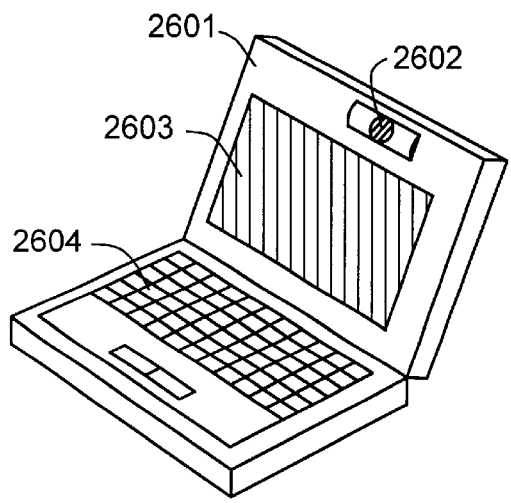

FIG. 13G shows a personal computer which is constituted by a main body 2601, an image input portion 2602, a display device 2603, and a keyboard 2604. The present invention can be applied to the image input portion 2602, the display device 2603, and other signal control circuits.

Figure 13H:
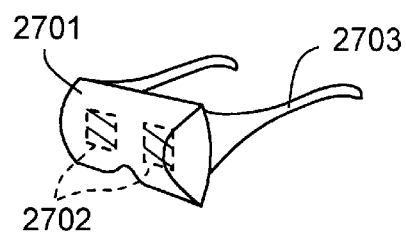

FIG. 13H shows a goggle type display which is constituted by a main body 2701, a display device 2702, and an arm portion 2703. The present invention can be applied to the display device 2702 and other signal control circuits.

Figure 13I:
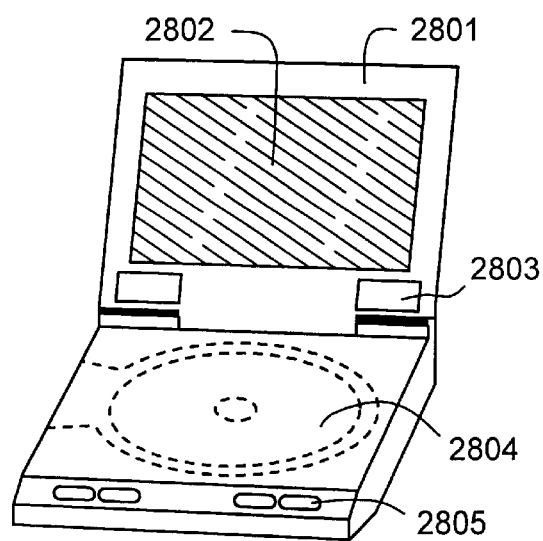

FIG. 13I shows a player apparatus which is equipped with a recording medium for recording a program (hereinafter, called "a recording medium"). The player apparatus is constituted by a main body 2801, a display device 2802, a speaker portion 2803, a recording medium 2804, an operation switch 2805 and an eternal input portion 2806 (not shown). This apparatus includes a DVD (digital Versatile Disc), a CD and the like as the recording medium for appreciating music and movie, playing a game, and Internet. The present invention can be applied to the display device 2802 and other signal control circuits.

Figure 13J:
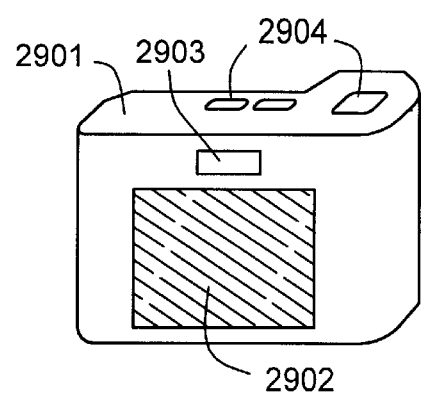

FIG. 13J shows a digital camera which is constituted by a main boy 2901, a display device 2902, an eyepiece portion 2903, an operation switch 2904 and an image receiving portion (not shown).

The present invention can be applied to the display device 2902 and other signal control circuits.

As described above, the application range of the present invention is quite wide, and the present invention is applicable to electronic apparatus of all fields. The present invention is also applicable to an electric bulletin board, a display for advertisement, and the like.

The structures of the above embodiments are applicable to, other than AMLCDs, various electrooptical devices and semiconductor circuits. Electrooptical devices other than the above AMLCDs include liquid crystal display devices of a simple matrix type driving system.

According to the present invention, since scattering of light increases and light can be reflected in a desired direction by forming a texture body having an uneven portion on the surface and a light reflection film on pixel electrodes, the device is applicable to a liquid crystal display panel for a wide range of electronic apparatus.

According to the present invention, a brighter liquid crystal panel with better visual recognizability compared with a conventional one can be obtained.

What is claimed is:

1. An active matrix type display device comprising:
   at least one substrate;
   a first electrode formed over said substrate, said first electrode having a flat surface;
   a body with a textured surface formed on said first electrode;
   a light reflection film comprising a material having a higher refractive index than that of said body and having a flat surface, said light reflection film formed over said first electrode and said body;
   a light modulating layer over said light reflection film; and
   a second electrode for applying an electric field on said light modulating layer.

2. A device according to claim 1, wherein said body has on its surface an uneven portion for scattering light, said uneven portion being 1 $\mu$m or less in height.

3. A device according to claim 1, further comprising an orientation film over said light reflection film.

4. A device according to claim 1, further comprising an interlayer insulating film under said body, said interlayer insulating film has a flat surface.

5. A device according to claim 1, wherein said first electrode is formed of a material selected from the group consisting of aluminum, a material with a main component thereof being aluminum, silver, and a material with a main component thereof being silver.

6. A device according to claim 1, wherein said light modulating layer comprises a liquid crystal material selected from the group consisting of a nematic, a smectic, and a cholesteric liquid crystal materials.

7. A device according to claim 1, wherein, in the case where the film thickness and the refractive index of said body are $d_1$ and $n_1$, respectively, the film thickness $d_1$ is adjusted to satisfy 300 mn$\leq\lambda\leq$800 mn (wherein $\lambda=4n_1d_1$) in a part of or substantially all over said body.

8. A device according to claim 1, wherein, in the case where the film thickness and the refractive index of said light reflection film are $d_2$ and $n_2$, respectively, the film thickness $d_2$ is adjusted to satisfy 300 nm$\leq\lambda\leq$800 nm (wherein $\lambda=4n_2d_2$) in a part of or substantially all over said light reflection film.

9. A device according to claim 1, wherein said body is formed of a material selected from the group consisting of $SiO_2$, $MgF_2$, $Na_3AlF_6$, an acrylic resin, and polyimide.

10. A device according to claim 1, wherein said light reflection film is formed of a material selected from the group consisting of $TiO_2$, $ZrO_2$, $Ta_2O_5$, ZnS, ZnSe, ZnTe, Si, Ge, $Y_2O_3$, $Al_2O_3$, and Indium Tin Oxide.

11. A device according to claim 1, wherein said active matrix type display device is a reflection type display device.

12. An active matrix type display device comprising:
   a first substrate comprising a semiconductor substrate or an insulating substrate;
   a first electrode comprising a metal material formed on said first substrate, said first electrode having a flat surface;
   a body with a textured surface comprising a material having a refractive index of 1.7 or less, said body formed on said first electrode; and
   a light reflection film comprising a material having a higher refractive index than that of said body and having a flat surface, said light reflection film formed on said body;
   a second substrate comprising a transparent substrate having a second electrode formed of a transparent material thereon; and
   a light modulating layer between said first and second substrates.

13. A device according to claim 12, wherein said body has on its surface an uneven portion for scattering light, said uneven portion being 1 $\mu$m or less in height.

14. A device according to claim 12, further comprising an orientation film over said light reflection film.

15. A device according to claim 12, further comprising an interlayer insulating film under said body, said interlayer insulating film having a flat surface.

16. A device according to claim 12, wherein said first electrode is formed of a material selected from the group consisting of aluminum, a material with a main component thereof being aluminum, silver, and a material with a main component thereof being silver.

17. A device according to claim 12, wherein said light modulating layer comprises a liquid crystal material selected from the group consisting of a nematic, a smectic, and a cholesteric liquid crystal materials.

18. A device according to claim 12, wherein, in the case where the film thickness and the refractive index of said body are $d_1$ and $n_1$, respectively, the film thickness $d_1$ is adjusted to satisfy 300 nm$\leq\lambda\leq$800 nm (wherein $\lambda=4n_1d_1$) in a part of or substantially all over said body.

19. A device according to claim 12, wherein, in the case where the film thickness and the refractive index of said light reflection film are $d_2$ and $n_2$, respectively, the film thickness $d_2$ is adjusted to satisfy 300 nm$\leq\lambda\leq$800 nm (wherein $\lambda=4n_2d_2$) in a part of or substantially all over said light reflection film.

20. A device according to claim 12, wherein said body is formed of a material selected from the group consisting of $SiO_2$, $MgF_2$, $Na_3AlF_6$, an acrylic resin, and polyimide.

21. A device according to claim 12, wherein said light reflection film is formed of a material selected from the group consisting of $TiO_2$, $ZrO_2$, $Ta_2O_5$, ZnS, ZnSe, ZnTe, Si, Ge, $Y_2O_3$, $Al_2O_3$, and Indium Tin Oxide.

22. A device according to claim 12, wherein said active matrix type display device is a reflection type display device.

23. An active matrix type display device comprising:
    a first substrate having an insulating surface;
    at least one thin film transistor on said insulating surface;
    an interlayer insulating film over said thin film transistor, said interlayer insulating film having a flat surface;
    a pixel electrode formed over said interlayer insulating film and connected to said thin film transistor, said pixel electrode having a flat surface;
    a body with a textured surface formed on said pixel electrode, said body comprising a material having a refractive index of 1.7 or less, and
    a light reflection film formed on said body and having a flat surface, said light reflection film comprising a material having a higher refractive index than that of said body,
    a second substrate formed of a transparent substrate, said second substrate having opposite electrode comprising a transparent material thereon; and
    a light modulating layer between said first and second substrates.

24. A device according to claim 23, wherein said body has on its surface an uneven portion for scattering light, said uneven portion being 1 μm or less in height.

25. A device according to claim 23, further comprising an orientation film over said light reflection film.

26. A device according to claim 23, wherein said body has on its surface an uneven portion for scattering light, said uneven portion being 0.3 μm or less in height.

27. A device according to claim 23, wherein said pixel electrode is formed of a material selected from the group consisting of aluminum, a material with a main component thereof being aluminum, silver, and a material with a main component thereof being silver.

28. A device according to claim 23, wherein said light modulating layer comprises a liquid crystal material selected from the group consisting of a nematic, a smectic, and a cholesteric liquid crystal materials.

29. A device according to claim 23, wherein, in the case where the film thickness and the refractive index of said body are $d_1$ and $n_1$, respectively, the film thickness $d_1$ is adjusted to satisfy 300 nm$\leq\lambda\leq$800 nm (wherein $\lambda=4n_1d_1$) in a part of or substantially all over said body.

30. A device according to claim 23, wherein, in the case where the film thickness and the refractive index of said light reflection film are $d_2$ and $n_2$, respectively, the film thickness $d_2$ is adjusted to satisfy 300 nm$\leq\lambda\leq$800 nm (wherein $\lambda=4n_2d_2$) in a part of or substantially all over said light reflection film.

31. A device according to claim 23, wherein said body is formed of a material selected from the group consisting of $SiO_2$, $MgF_2$, $Na_3AlF_6$, an acrylic resin, and polyimide.

32. A device according to claim 23, wherein said light reflection film is formed of a material selected from the group consisting of $TiO_2$, $ZrO_2$, $Ta_2O_5$, ZnS, ZnSe, ZnTe, Si, Ge, $Y_2O_3$, $Al_2O_3$, and Indium Tin Oxide.

33. A device according to claim 23, wherein said active matrix type display device is a reflection type display device.

34. A device according to claim 23, wherein said thin film transistor is a top gate type thin film transistor.

35. A device according to claim 23, wherein said thin film transistor is a bottom gate type thin film transistor.

36. An active matrix type display device comprising:
    a first substrate having an insulating surface thereon;
    a first electrode formed over said insulating surface, said first electrode having a flat surface;
    a body with a textured surface formed on said first electrode;
    a light reflection film formed over said body and said first electrode and having a flat surface, said light reflection film comprising a material having a higher refractive index than that of said body;
    an orientation film formed on said light reflection film;
    a light modulating layer over said orientation film; and
    a second substrate having a second electrode for applying an electric field on said light modulating layer.

37. A device according to claim 36, wherein said body has on its surface an uneven portion for scattering light, said uneven portion being 1 μm or less in height.

38. A device according to claim 36, wherein said body has on its surface an uneven portion for scattering light, said uneven portion being 0.3 μm or less in height.

39. A device according to claim 36, wherein said first electrode comprises a material selected from the group consisting of aluminum, a material with a main component thereof being aluminum, silver, and a material with a main component thereof being silver.

40. A device according to claim 36, wherein said light modulating layer comprises a liquid crystal material selected from the group consisting of a nematic, a smectic, and a cholesteric liquid crystal materials.

41. A device according to claim 36, wherein, in the case where the film thickness and the refractive index of said body are $d_1$ and $n_1$, respectively, the film thickness $d_1$ is adjusted to satisfy 300 nm$\leq\lambda\leq$800 nm (wherein $\lambda=4n_1d_1$) in a part of or substantially all over said body.

42. A device according to claim 36, wherein, in the case where the film thickness and the refractive index of said light reflection film are $d_2$ and $n_2$, respectively, the film thickness $d_2$ is adjusted to satisfy 300 nm$\leq\lambda\leq$800 nm (wherein $\lambda=4n_2d_2$) in a part of or substantially all over said light reflection film.

43. A device according to claim 36, wherein said body comprises a material selected from the group consisting of $SiO_2$, $MgF_2$, $Na_3AlF_6$, an acrylic resin, and polyimide.

44. A device according to claim 36, wherein said light reflection film comprises a material selected from the group consisting of $TiO_2$, $ZrO_2$, $Ta_2O_5$, ZnS, ZnSe, ZnTe, Si, Ge, $Y_2O_3$, $Al_2O_3$, and Indium Tin Oxide.

45. A device according to claim 36, wherein said electrooptical display device is a reflection type display device.

46. An active matrix type display device comprising:
    a first substrate having an insulating surface thereon;
    at least one thin film transistor on said insulating surface;
    a pixel electrode electrically connected with said thin film transistor and having a flat surface;
    a body with a textured surface formed on said pixel electrode;
    a light reflection film formed on said body and said pixel electrode, said light reflection film comprising a material having a higher refractive index than that of said body;
    a light modulating layer formed over said light reflection film; and a second substrate having an opposite electrode for applying an electric field on said light modulating layer.

47. A device according to claim 46, wherein said body has on its surface an uneven portion for scattering light, said uneven portion being 1 µm or less in height.

48. A device according to claim 46, wherein said body has on its surface an uneven portion for scattering light, said uneven portion being 0.3 µm or less in height.

49. A device according to claim 46, wherein said pixel electrode comprises a material selected from the group consisting of aluminum, a material with a main component thereof being aluminum, silver, and a material with a main component thereof being silver.

50. A device according to claim 46, wherein said light modulating layer comprises a liquid crystal material selected from the group consisting of a nematic, a smectic, and a cholesteric liquid crystal materials.

51. A device according to claim 46, wherein, in the case where the film thickness and the refractive index of said body are $d_1$ and $n_1$, respectively, the film thickness $d_1$ is adjusted to satisfy 300 nm$\leq\lambda\leq$800 nm (wherein $\lambda=4n_1d_1$) in a part of or substantially all over said body.

52. A device according to claim 46, wherein, in the case where the film thickness and the refractive index of said light reflection film are $d_2$ and $n_2$, respectively, the film thickness $d_2$ is adjusted to satisfy 300 nm$\leq\lambda\leq$800 nm (wherein $\lambda=4n_2d_2$) in a part of or substantially all over said light reflection film.

53. A device according to claim 46, wherein said body comprises a material selected from the group consisting of $SiO_2$, $MgF_2$, $Na_3AlF_6$, an acrylic resin, and polyimide.

54. A device according to claim 46, wherein said light reflection film comprises a material selected from the group consisting of $TiO_2$, $ZrO_2$, $Ta_2O_5$, ZnS, ZnSe, ZnTe, Si, Ge, $Y_2O_3$, $Al_2O_3$, and Indium Tin Oxide.

55. A device according to claim 46, further comprising an orientation film over said light reflection film.

56. A device according to claim 1, wherein said light reflection film is formed so as to fill up in uneven portions of said body and spaces between adjacent first electrodes.

57. A device according to claim 12, wherein said light reflection film is formed so as to fill up in uneven portions of said body and spaces between adjacent first electrodes.

58. A device according to claim 23, wherein said light reflection film is formed so as to fill up in uneven portions of said body and spaces between adjacent pixel electrodes.

59. A device according to claim 36, wherein said light reflection film is formed so as to fill up in uneven portions of said body and spaces between adjacent first electrodes.

60. A device according to claim 46, wherein said light reflection film is formed so as to fill up in uneven portions of said body and spaces between adjacent pixel electrodes.

61. An active matrix type display device comprising:
   at least one substrate;
   a first electrode formed over said substrate, said first electrode having a flat surface;
   a body with a textured surface formed on said first electrode;
   a light reflection film comprising a material having a higher refractive index than that of said body, said light reflection film formed over said first electrode and said body;
   a light modulating layer over said light reflection film; and
   a second electrode for applying an electric field on said light modulating layer.

62. A device according to claim 61, wherein said body has on its surface an uneven portion for scattering light, said uneven portion being 1 µm or less in height.

63. A device according to claim 61, further comprising an orientation film over said light reflection film.

64. A device according to claim 61, further comprising an interlayer insulating film under said body, said interlayer insulating film has a flat surface.

65. A device according to claim 61, wherein said first electrode is formed of a material selected from the group consisting of aluminum, a material with a main component thereof being aluminum, silver, and a material with a main component thereof being silver.

66. A device according to claim 61, wherein said light modulating layer comprises a liquid crystal material selected from the group consisting of a nematic, a smectic, and a cholesteric liquid crystal materials.

67. A device according to claim 61, wherein, in the case where the film thickness and the refractive index of said body are $d_1$ and $n_1$, respectively, the film thickness $d_1$ is adjusted to satisfy 300 nm$\leq\lambda\leq$800 nm (wherein $\mu=4n_1d_1$) in a part of or substantially all over said body.

68. A device according to claim 61, wherein, in the case where the film thickness and the refractive index of said light reflection film are $d_2$ and $n_2$, respectively, the film thickness $d_2$ is adjusted to satisfy 300 nm$\leq\lambda\leq$800 nm (wherein $\lambda=4n_2d_2$) in a part of or substantially all over said light reflection film.

69. A device according to claim 61, wherein said body is formed of a material selected from the group consisting of $SiO_2$, $MgF_2$, $Na_3AlF_6$, an acrylic resin, and polyimide.

70. A device according to claim 61, wherein said light reflection film is formed of a material selected from the group consisting of $TiO_2$, $ZrO_2$, $Ta_2O_5$, ZnS, ZnSe, ZnTe, Si, Ge, $Y_2O_3$, $Al_2O_3$, and Indium Tin Oxide.

71. A device according to claim 61, wherein said active matrix type display device is a reflection type display device.

72. An active matrix type display device comprising:
   a first substrate having an insulating surface thereon;
   a first electrode formed over said insulating surface, said first electrode having a flat surface;
   a body with a textured surface formed on said first electrode;
   a light reflection film formed over said body and said first electrode, said light reflection film comprising a material having a higher refractive index than that of said body;
   an orientation film formed on said light reflection film;
   a light modulating layer over said orientation film; and
   a second substrate having a second electrode for applying an electric field on said light modulating layer.

73. A device according to claim 72, wherein said body has on its surface an uneven portion for scattering light, said uneven portion being 1 µm or less in height.

74. A device according to claim 72, wherein said body has on its surface an uneven portion for scattering light, said uneven portion being 0.3 µm or less in height.

75. A device according to claim 72, wherein said first electrode comprises a material selected from the group consisting of aluminum, a material with a main component thereof being aluminum, silver, and a material with a main component thereof being silver.

76. A device according to claim 72, wherein said light modulating layer comprises a liquid crystal material selected from the group consisting of a nematic, a smectic, and a cholesteric liquid crystal materials.

77. A device according to claim 72, wherein, in the case where the mm thickness and the refractive index of said body are $d_1$ and $n_1$, respectively, the film thickness $d_1$ is adjusted to satisfy 300 nm$\leq\lambda\leq$800 nm (wherein $\lambda=4n_1d_1$) in a part of or substantially all over said body.

78. A device according to claim 72, wherein, in the case where the film thickness and the refractive index of said light reflection film are $d_2$ and $n_2$, respectively, the film thickness $d_2$ is adjusted to satisfy 300 nm$\leq\lambda\leq$800 nm (wherein $\lambda=4n_2d_2$) in a part of or substantially all over said light reflection film.

79. A device according to claim 72, wherein said body comprises a material selected from the group consisting of $SiO_2$, $MgF_2$, $Na_3AlF_6$, an acrylic resin, and polyimide.

80. A device according to claim 72, wherein said light reflection film comprises a material selected from the group consisting of $TaO_2$, $ZrO_2$, $Ta_2O_5$, ZnS, ZnSe, ZnTe, Si, Ge, $Y_2O_3$, $Al_2O_3$, and Indium Tin Oxide.

81. A device according to claim 72, wherein said electrooptical display device is a reflection type display device.

* * * * *